United States Patent
Lin et al.

(10) Patent No.: US 6,934,958 B2
(45) Date of Patent: Aug. 23, 2005

(54) AIRFLOW GUIDANCE STRUCTURE FOR HEAT DISCHARGE IN OPTICAL STORAGE CARRIER PLAYER

(75) Inventors: Sung-Po Lin, Banchiau (TW); Chi-Cheng Lin, Taoyuan (TW); Max M. S. Tsai, Taoyuan (TW)

(73) Assignee: Benq Corporation, Taoyuan (TW)

( * ) Notice: Subject to any disclaimer, the term of this patent is extended or adjusted under 35 U.S.C. 154(b) by 181 days.

(21) Appl. No.: 10/142,328

(22) Filed: May 9, 2002

(65) Prior Publication Data

US 2002/0190616 A1 Dec. 19, 2002

(30) Foreign Application Priority Data

Jun. 18, 2001  (TW) ........................................ 90114702 A

(51) Int. Cl.[7] ............................................. G11B 33/02
(52) U.S. Cl. ..................................................... 720/649
(58) Field of Search ........................ 720/649; 369/75.1, 369/75.2; 360/97.01, 97.02

(56) References Cited

U.S. PATENT DOCUMENTS

| | | | | |
|---|---|---|---|---|
| 5,086,422 A | * | 2/1992 | Hagiya et al. | ............. 369/75.1 |
| 5,335,217 A | * | 8/1994 | Kaneda et al. | ............. 369/77.2 |
| 5,793,740 A | | 8/1998 | Nguyen | |
| 5,898,545 A | * | 4/1999 | Schirle | ...................... 360/254.7 |
| 6,011,689 A | * | 1/2000 | Wrycraft | ..................... 361/695 |
| 6,108,164 A | * | 8/2000 | Weber, Jr. | ................. 360/97.02 |

FOREIGN PATENT DOCUMENTS

| JP | 58212684 A | * | 12/1983 | ........... G11B/25/04 |
|---|---|---|---|---|
| JP | 10-148440 | | 6/1998 | |
| JP | 11-112177 | | 4/1999 | |

* cited by examiner

Primary Examiner—Angel Castro
Assistant Examiner—Mark Blouin
(74) Attorney, Agent, or Firm—Snell & Wilmer, L.L.P.

(57) ABSTRACT

The present invention relates to an airflow guidance structure in an optical storage carrier player. More particularly, the present invention relates to an airflow guidance structure in a CD-RW drive. The airflow guidance structure provides a path and cooperates with outlets disposed close to the end of the airflow guidance structure. Heat generated during the operation of the CD-RW drive is discharged from the outlets by using the airflow generated by the rotation of the disc.

8 Claims, 3 Drawing Sheets

AIRFLOW GUIDANCE STRUCTURE FOR HEAT DISCHARGE IN OPTICAL STORAGE CARRIER PLAYER

This application claims priority of Taiwan Patent Application Serial No. 90114702 filed on Jun. 18, 2001.

FIELD OF INVENTION

The present invention relates to an airflow guidance structure in an optical storage carrier player. More particularly, the present invention relates to an airflow guidance structure in a compact disk player.

BACKGROUND OF THE INVENTION

Due to consumer demand, the recording speed of CD-RW drives continues to increase. The heat generated during the operation of the CD-RW drive typically increases with the recording speed, however. This additional heat adversely affects the efficiency of the CD-RW drive and may damage the circuits or components of the CD-RW drive.

Traditionally, a small fan is used in the CD-RW drive for discharging the heat generated during the operation. When the CD-RW drive operates, the fan operates at the same time to convey the air inside the CD-RW drive. The housing of the traditional CD-RW drive includes an outlet. The circulated air with the heat is discharged from the outlet to decrease the temperature inside the CD-RW drive.

It is typically efficient to discharge the heat from the CD-RW drive by using the fan. However, the cost of the CD-RW drive typically increases due to adding a fan. Moreover, the CD-RW drive cannot normally discharge heat if the fan broken down. It is therefore desirable to provide a low-cost heat discharge structure in the CD-RW drive for efficiently discharging the heat.

SUMMARY OF THE INVENTION

The present invention relates to an airflow guidance structure in an optical storage carrier player. More particularly, the present invention relates to an airflow guidance structure in a CD-RW drive.

In an exemplary embodiment, the airflow guidance structure of the present invention is a plate structure. The structure is disposed on an internal surface of the upper cover of the CD-RW drive, i.e., part of the structure may be disposed right above the CD disc turntable. A first end portion of the structure is adjacent to one lateral sidewall of the upper case. The lateral sidewall includes a plurality of outlets formed close to the first end portion. When the CD disc is rotated within the CD-RW drive, it will generates certain airflow within the CD-RW drive. The airflow guidance structure provides a path for discharging the heat from the outlets by guiding the airflow generated by the rotation of the disc.

When an optical storage carrier is rotated within the carrier player, it will generate a hot airflow within the CD-RW drive. The hot airflow is then guided by the airflow guidance structure and flows from the center toward the lateral sidewall.

In another exemplary embodiment, the second end portion of the airflow guidance structure bends toward a downwind side with an angle. Thus the hot airflow can easily flow along the airflow guidance structure and discharge the hot airflow from the outlets.

The airflow guidance structures disclosed herein is further appropriate for many kinds of optical storage carrier player, for example, CD-ROM, CD-R (CD Recordable), CD-RW drive (CD Rewritable), and CD-E (CD Erasable).

DETAILED DESCRIPTION

Figure 1:
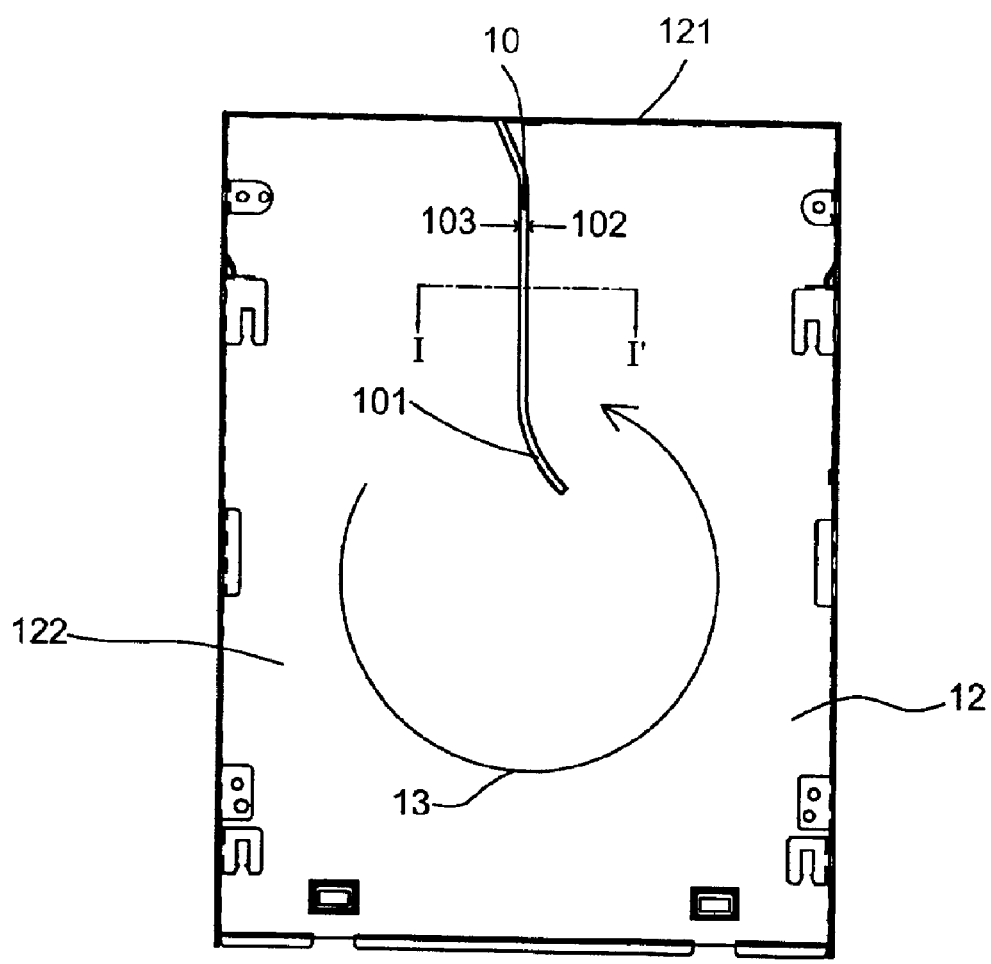
FIG. 1 depicts the bottom view of airflow guidance structure of the present invention.
Figure 2:
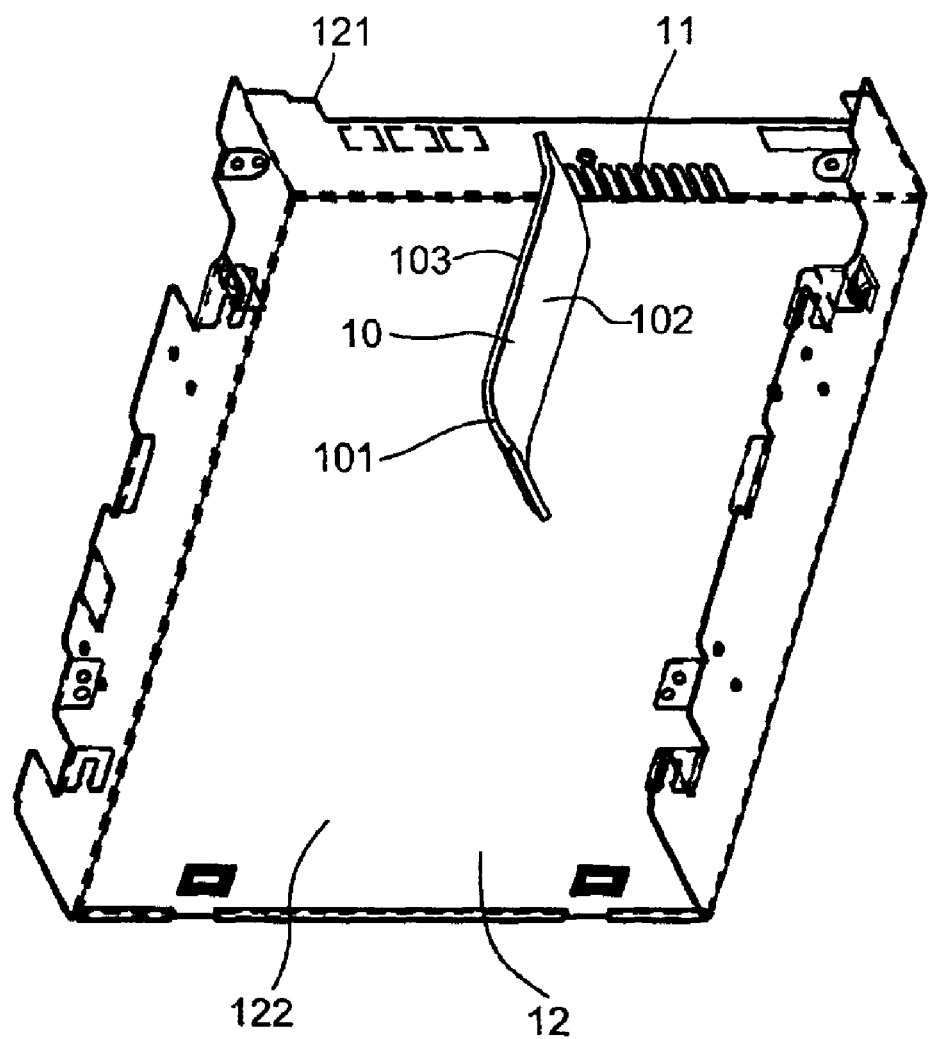
FIG. 2 depicts an exemplary embodiment of the airflow guidance structure.

Please refer to FIGS. 1 and 2. FIG. 1 depicts a bottom view of an exemplary airflow guidance structure 10 of the present invention. The airflow guidance structure 10 is appropriately disposed on a flat plane 122 on an interior side of upper case 12 of the CD-RW drive. A first end portion of structure 10 is adjacent to a lateral sidewall 121 on the interior side of the upper case 12. The first end portion is not limited in perpendicular to the lateral sidewall 121. For smoothly discharging the airflow with the heat along structure 10, structure 10 may be adjacent to lateral sidewall 121 by an angle. When a disc is rotated within the CD-RW drive, the airflow is generated along a rotating direction 13 shown in FIG. 1 (counterclockwise). A second end portion of the airflow guidance structure 10 includes a bend portion 101. The bend portion 101 is suitably bent in the direction opposite to the rotating direction 13 of the disc, as shown. That is, the second end portion bends toward a downwind side 102 of the airflow guidance structure 10 by an angle to avoid that the airflow flows to the upwind side.

Please refer to FIG. 2. FIG. 2 depicts an exemplary embodiment of airflow guidance structure 10 wherein the scale of airflow guidance structure 10 to upper case 12 has been exaggerated for illustration purposes. The portion of the lateral sidewall 121 adjacent to the airflow guidance structure 10 includes one or more outlets 11. In an exemplary embodiment, the outlets are disposed on the downwind side 102 of the airflow guidance structure 10. The airflow generated by the rotation of the disc brings the heat generated during the operation of the CD player to form a thermal airflow. As FIG. 1 shows, the thermal airflow flows along rotating direction 13. When the thermal airflow hits airflow guidance structure 10, the thermal airflow flows along airflow guidance structure 10 toward lateral sidewall 121. Finally, the thermal airflow is discharged from outlets 11. As described above, outlets 11 are disposed on lateral sidewall 121 in this exemplary embodiment. However, in the other embodiment, outlets 11 also may be disposed on the flat plane 122, or elsewhere within the structure.

With continued reference to FIG. 2, the optical storage carrier player includes: flat plane 122 with a center 124; a lateral sidewall 121 formed on one end of flat plane 122; and airflow guidance structure 10 protruding from flat plane 122. The longitudinal axis of the airflow guidance structure 10 substantially extends from center 124 of flat plane 122 toward lateral sidewall 121. When the optical storage carrier is rotated within the carrier player, a hot airflow is suitably generated within optical carrier player drive. The hot airflow is then guided by airflow guidance structure 10 from the center 124 toward the lateral sidewall 121 to effectively remove the heat from the interior of the optical storage carrier player to the outside environment, as appropriate.

Figure 3A:
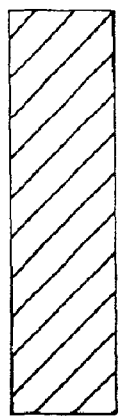
FIG. 3a is a profile of the exemplary embodiment shown in FIG. 1 along the I–I' line.
Figure 3B:
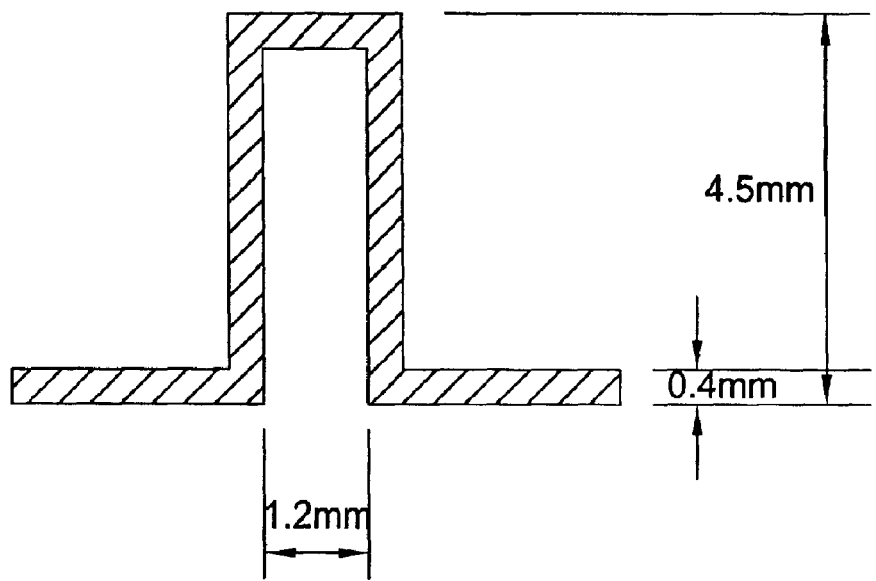
FIG. 3b is a profile of another embodiment of the present invention.

Please refer to FIG. 3a. FIG. 3a is a profile of a further exemplary embodiment of the present invention. Airflow guidance structure 10 may be a plate as shown in FIGS. 1 and 2. In other embodiments, however, the material of guidance structure 10 is PVC, plastic, metal or the like. FIG. 3b shows the dimensions and shape of the profile. In the exemplary embodiment shown, the thickness is about 0.4 mm, and the height is about 4.5 mm. The inside of air guidance structure 10 may be hollow to reduce the cost. In a further embodiment, the width of the hollow portion is about 1.2 mm.

Outlets 11 may be designed in accordance with safety codes or other requirements. Further, many problems, such as the dust, should be considered. In an exemplary embodiment, outlets 11 are designed as eight to ten rectangular holes with dimensions of about 2.5 mm×10 mm. The spacing between two adjacent holes may be about 1.5 mm, as shown.

Airflow guidance structure 10 may substitute for the traditional small fan in a CD player to decrease the temperature and the cost of the CD-RW drive. In an exemplary embodiment, airflow guidance structure 10 is appropriate for all kinds of CD players such as CD-ROM, CD-R (CD Recordable), CD-RW (CD Rewritable), CD-B (CD Erasable), and the like. It is not intended to limit the scope and applicability of the present invention, and any embodiment of the application of the airflow guidance structure 10 without departing from the spirit and feature of the invention is within the protected scope.

The above description sets fourth various exemplary embodiments of the invention only, and is not intended to limit the scope, applicability, or configuration of the invention in any way. For example, the exemplary material of airflow guidance structure 10 is PVC. However, the material of the airflow guidance structure 10 is not so limited, and any material forming airflow guidance structure 10 is within the scope of the present invention. Additionally, even though the exemplary dimensions of the airflow guidance structure 10 have been described above, the present invention is not limited to the dimensions included herein. Rather, various changes may be made in the function and arrangement of the elements described in these embodiments without departing from the spirit and scope of the invention. Thus, the protected scope of the present invention is as set fourth in the appended claims and their equivalents.

What is claimed is:

1. An optical storage carrier player for rotating an optical storage carrier, the optical storage carrier player comprising:
   a flat plane having a center;
   a lateral sidewall formed on an end of said flat plane, said lateral sidewall including at least one outlet; and
   an airflow guidance structure protruded from said flat plane, part of said airflow guidance structure being located above said optical storage carrier, a longitudinal axis of said airflow guidance structure substantially extending from the center of said flat plane toward said lateral sidewall;
   wherein a hot airflow is generated when the optical storage carrier is rotating within the carrier player, and said hot airflow is guided by said airflow guidance structure so as to flow from the center toward the lateral sidewall and be discharged through said outlet.

2. The optical storage carrier player of claim 1, wherein the airflow guidance structure has a downwind side and a second end portion of the airflow guidance structure bends toward said downwind side by an angle.

3. The optical storage carrier player of claim 1, wherein the material of the airflow guidance structure is PVC.

4. The optical storage carrier player of claim 1, wherein at least one outlet is disposed on the downwind of the airflow guidance structure.

5. The optical storage carrier player of claim 2, wherein the flat plane includes at least one to discharge the airflow.

6. The optical storage carrier player of claim 5, wherein said outlet is disposed on said downwind side of said airflow guidance structure.

7. The optical storage carrier player of claim 1, wherein said airflow guidance structure is a plate structure.

8. The optical storage carrier player of claim 1, wherein said flat plane is an upper case of the said optical storage carrier player.

* * * * *